(12) United States Patent
Paximadis et al.

(10) Patent No.: US 7,573,033 B2
(45) Date of Patent: Aug. 11, 2009

(54) AUTOMATICALLY OPTIMIZED CYCLIC INTEGRATION

(75) Inventors: John M. Paximadis, Westlake, OH (US); Richard Pettegrew, Parma Heights, OH (US)

(73) Assignee: Innovative Engineering & Consulting Corp., Middleburg Heights, OH (US)

( * ) Notice: Subject to any disclaimer, the term of this patent is extended or adjusted under 35 U.S.C. 154(b) by 245 days.

(21) Appl. No.: 11/710,018

(22) Filed: Feb. 23, 2007

(65) Prior Publication Data

US 2007/0228278 A1 Oct. 4, 2007

Related U.S. Application Data

(60) Provisional application No. 60/777,020, filed on Feb. 27, 2006.

(51) Int. Cl.
*G01J 5/02* (2006.01)
*G03B 7/08* (2006.01)
*H04N 3/14* (2006.01)

(52) U.S. Cl. .............. 250/342; 250/338.1; 396/231; 374/103; 348/294; 348/397; 348/398

(58) Field of Classification Search .......... 250/338.1, 250/342, 348; 396/231; 374/103; 348/294, 348/397, 398
See application file for complete search history.

(56) References Cited

U.S. PATENT DOCUMENTS

| | | | | |
|---|---|---|---|---|
| 4,399,464 A | * | 8/1983 | Hix et al. ................ | 348/306 |
| 6,198,086 B1 | * | 3/2001 | Schanz et al. ............ | 250/208.1 |
| 6,836,288 B1 | * | 12/2004 | Lewis .................... | 348/229.1 |

* cited by examiner

*Primary Examiner*—David P Porta
*Assistant Examiner*—Casey Bryant
(74) *Attorney, Agent, or Firm*—Kraguljac & Kalnay, LLC

(57) ABSTRACT

Systems, methods, and other embodiments associated with automatically optimizing cyclic integration are described. One method embodiment includes repetitively acquiring a thermal intensity data using an infrared detector configured to operate for an integration time. The method embodiment may also include extracting a useable data from the intensity data and then updating a rolling composite image with the useable data. The method may also include selectively automatically updating the integration time based on whether the thermal intensity data included a value that fell outside the pre-determined range.

19 Claims, 7 Drawing Sheets

AUTOMATICALLY OPTIMIZED CYCLIC INTEGRATION

CROSS REFERENCE TO RELATED APPLICATION

This application claims the benefit of U.S. Provisional Patent Application Ser. No. 60/777,020 filed Feb. 27, 2006, titled "Automatically Optimized Cyclic Integration".

BACKGROUND

Infrared (IR) imaging facilitates viewing the relative thermal intensity of objects in a scene. IR imaging may include, for example, long wave IR (e.g., 7-14 microns), mid-wave IR (e.g., 3-5 microns), near IR (e.g., 0.7-2 microns), and so on.

IR imaging systems include a thermal imager. A thermal imager may include a detector that includes an arrangement (e.g., two-dimensional array) of individual IR sensors. The IR sensors may be configured to digitize an analog thermal intensity signal into a discrete value. The detector may be configured to repeatedly sample a scene at a sampling rate. The imaging system may be configured to provide images at a video refresh rate. So long as the sample rate exceeds the video refresh rate, meaningful real-time imagery may be possible. Manual integration value manipulation and post-acquisition image reconstruction may make real-time imagery difficult, if possible at all.

During signal acquisition, infrared measurements are collected for a period of time referred to as the integration time or the integration period. Longer integration times facilitate viewing less thermally intense objects while shorter integration times facilitate viewing more thermally intense objects. Scenes having both less thermally intense objects and more thermally intense objects may complicate selecting an appropriate integration time.

To understand the integration time selection issue, consider that a long wave IR sensor can only measure values in a fixed range. For example, a 12 bit IR sensor can digitize thermal intensity analog signals into $2^{12}$ discrete values (e.g., 0 to 4095) while a 16 bit IR sensor can digitize signals into $2^{16}$ (e.g., 0 to 65,535) discrete values. Within its fixed range, an IR sensor may exhibit different response patterns. For example, near the center of the fixed range the IR sensor may exhibit a linear response while near the ends of the fixed range the IR sensor may not exhibit a linear response. This linear versus non-linear response can affect the quality of images produced from the digitized signals, particularly when a scene includes objects exhibiting a wide range of temperatures. It is to be appreciated that IR sensors in other ranges may have similar issues. Similarly, it is to be appreciated that other sensors (e.g., optical sensors) may exhibit similar traits.

Conventionally, a single integration time may be selected and employed based on an overall (e.g., average) thermal intensity of a scene. However, this approach may provide sub-optimal results since some objects may not provide enough thermal radiation for meaningful acquisition while others may provide so much thermal radiation they overwhelm the detectors. Shortening the integration time to account for warm objects may cause colder objects to "disappear" while lengthening the integration time to account for cold objects may cause warmer objects to be over-exposed. In either case scene detail may be lost.

To address this integration time selection issue, some conventional systems have employed manually controlled cyclic integration. Cyclic integration involves imaging a scene multiple times using different integration times for various images. Conventional systems may require a user to manually select the integration time. The separate images acquired with different integration times may then be reconstructed into a single image. By way of illustration, a first image may be acquired at a first time using a first user-selected integration time, a second image may be acquired at a second time using a second user-selected integration time, and a third image may be acquired at a third time using a third user-selected integration time. The three integration times may account for different thermal intensities for different objects in a scene. In other applications, the three integration times may account for different optical intensities for different objects in a scene. The three images may then be reconstructed into a single image that includes the most useful data from each of the three images. The most useful data may be selected, for example, using intensity thresh-holding criteria.

Reconstruction for manually controlled cyclic integration systems is conventionally performed in a post-processing action. The post-processing step can make the reconstructed images substantially worthless for real-time surveillance and/or targeting applications due to time lag. To employ post-processed images in real-time applications would require detectors with an unusually high sampling rate that is sufficient to acquire images with each of the different integration times in less than the output video refresh period. Additionally, the post-processing system would be required to assemble the images in a period of time less than the refresh period minus the accumulated sampling time. This type of system would likely be prohibitively expensive. Even if such a system could be built, it would likely require a-priori knowledge of useful integration times and would also likely require manual intervention to adjust integration times in response to changing scenes. These constraints are unacceptable in many real-time surveillance and/or targeting applications.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that unless otherwise stated one element may be designed as multiple elements, multiple elements may be designed as one element, an element shown as an internal component of another element may be implemented as an external component and vice versa, and so on. Furthermore, elements may not be drawn to scale.

DETAILED DESCRIPTION

Figure 1:
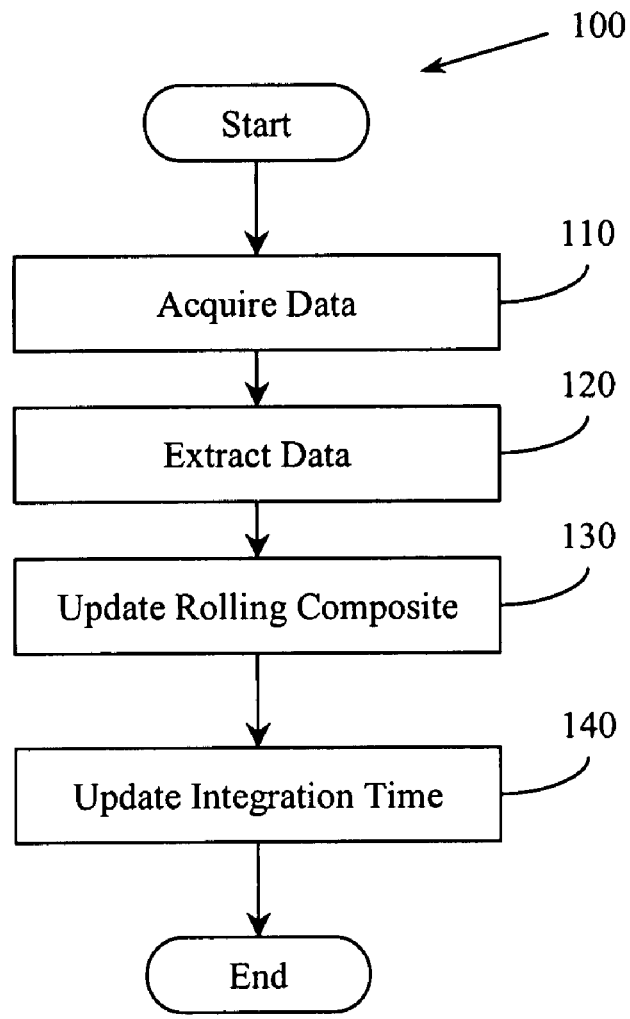
FIG. 1 illustrates an example method for automatically optimizing cyclic integration.

Example systems and methods concern automatically optimizing cyclic integration times. Example systems and methods may also concern producing a rolling composite image from images acquired with automatically controlled integration times. Example systems and methods facilitate real-time imaging with composite images reconstructed from multiple images where different images may be acquired with different integration times. The different integration times may be automatically selected and may respond to changing conditions in a scene. The images may be acquired from imaging systems including IR imaging systems and other imaging systems.

In one example, a first image is acquired using a first integration time. Unlike conventional systems, this first integration time may be automatically selected. A determination is made concerning whether the first image includes any useful data. Another determination may also be made concerning whether the first image includes any data that indicates useful data may be acquired by imaging a scene using an amended integration time(s). For example, a determination may be made concerning whether a digitized value(s) for a portion of the first image falls above and/or below configurable thresholds. The configurable thresholds may correspond, for example, to the upper and lower ends of a linear response range for a detector when operated at given thresholds. The configurable thresholds may model, for example, the upper 15% or lower 15% of bit values in a fixed range. By way of illustration, consider a 12 bit detector whose fixed range is 0 to 4095. Digitized values below 615 and/or above 3480 (at the given integration time) may indicate that more useful data may be acquired with a different integration time. While a 12 bit detector, a lower limit of 615 and an upper limit of 3480 are described, it is to be appreciated that other detectors and other limits may be employed.

Manipulating the integration time for signal acquisition can facilitate acquiring more useful data, especially at the ends of the fixed range. For example, having a longer integration time can facilitate acquiring more accurate data concerning less thermally intense items. The less thermally intense items will provide lesser quantities of thermal radiation and therefore, to acquire sufficient thermal radiation for meaningful detection and distinctions the detector may be controlled to detect for a longer period of time. When the less thermally intense item causes a detector to operate well outside the linear response range, the integration time may need to be drastically lengthened. Similarly, having a shorter integration time can facilitate acquiring more accurate data concerning more thermally intense items. The more thermally intense items will provide greater quantities of thermal radiation. Therefore, to prevent acquiring excessive thermal radiation that will exceed the maximum accumulated value for a detector, the detector is controlled to detect for a shorter period of time. Once again, when the more thermally intense item causes a detector to operate well outside the linear response range, the integration time may need to be drastically shortened.

While IR imaging and issues related to thermal intensity are described in the preceding paragraph, it is to be appreciated that other non-IR imaging systems may have similar issues. For example, scenes in which items have greatly different intensities may create similar issues for optical imaging systems. For example, a scene that includes a piece of black paper and a window reflecting the sun may create "out-of-range" issues for optical imaging systems. Thus, integration times for such systems may also be automatically cyclically optimized using techniques analogous to those described herein.

Useful data from the first image may add to a rolling composite image. If all the data in the first image was within the configurable range, then subsequent images may be acquired using the same integration value. Acquisition with this first integration time may continue until some data falls outside the configurable range. When data outside the configurable range is detected, plans may be made to acquire an image(s) using an amended integration time(s) as well as to continue acquiring images using the current integration time. The image(s) with an amended configuration time(s) may be acquired, for example, in between subsequent acquisitions at the current integration time.

In one example, a second image may be acquired using a second (e.g., the amended) integration value. For example, if some data fell below the low threshold, then a second image may be acquired with a longer integration time to facilitate collecting enough thermal energy to image a colder item. Additionally, if some data rose above the high threshold, then a third image may be acquired with a shorter integration time to facilitate collecting only enough thermal energy to image a warmer item. While three integration times are described, it is to be appreciated that N (N being an integer) integration times may be planned in a sequence. While a "planned sequence" is described, it is to be appreciated that in one example no "planning" may occur, and that integration times may be computed based on previous integration times and the amount and/or type of useful data obtained with previous integration times.

The value selected for an amended integration time(s) may be determined, for example, by how far out of the fixed range the outlying data was found. For example, outlying data that is nominally above or below a threshold may lead to an integration time that is nominally amended. However, outlying data that is well above or below a threshold may lead to a larger increase in integration times.

Useful data acquired from the second and/or third image may then be added to the rolling composite image as it is acquired and determined to be useful. Rather than acquiring a complete set of images, combining the complete set in a single post-processing step, discarding the complete set, and starting over to acquire another complete set of images, useful data can be added to the rolling composite image at substantially any time. In one example, the useful data may be added after each acquisition.

In one example, parallel processing may be employed. For example, one processor and/or process may control acquiring data, another processor and/or process may control determining whether useful information was acquired, another processor and/or process may control determining whether outlying data was found, another processor and/or process may control planning future integration times, and another processor and/or process may handle combining useful data into the rolling composite image.

It is possible that an image acquired with an amended integration time may not include any useful data. In this case, the amended integration time may subsequently be removed from a planned series of image acquisitions. It is also possible that an image acquired with an amended integration time may include some useful data and some data that is still not useful because it is even farther outlying. Thus, yet another integration time(s) may be computed and an image acquisition using that integration time may be scheduled and/or performed.

Over time, the example systems and methods may automatically learn which integration times produce useful data and which integration times do not. Furthermore, over time the example systems and methods may automatically learn which integration times produce the greatest amount of useful data and the least amount of useful data. A sequence of images may be planned based on this acquired knowledge. The sequence may be weighted more heavily towards the integration times that produce the most useful data but may also include integration times that facilitate providing complete and/or substantially complete coverage for the existing thermal intensity range.

Since a scene may not be static, and since items with relatively high or low intensity (e.g., thermal intensity, optical intensity) may move into or out of a scene, integration times may come and go from a sequence. For example, while a thermally intense item is in frame, a sequence may include a "standard" integration time and two additional integration times that facilitate acquiring useful information concerning the thermally intense item. After the thermally intense item leaves the scene, these two additional integration times may automatically be removed from the sequence since they no longer yield additional useful information and since the image acquired using the "standard" integration time will not produce any outlying data. Similarly, while a cold item is in frame, a sequence may include two standard integration times and one additional integration time that facilitates acquiring useful information concerning the cold item. When the cold item leaves the scene its related integration time may also automatically be removed from the sequence since images acquired using the longer integration time no longer yield additional useful information and since the images acquired using the "standard" integration time contain no outlying data.

This heuristically optimized approach facilitates cyclic integration without requiring a priori knowledge about a scene and without requiring manual intervention. Additionally, since useful information from each image is added to the rolling composite image, real-time display with a refresh rate of about 30 Hz is possible using conventional image acquisition devices operating at around 60 Hz. Consider a surveillance scene that can be covered by two or three integration times. With two integration times, 60 Hz imaging can be distilled into a 30 Hz composite frame. However, if three integration times are used, the rolling composite image strategy may be employed to continue to produce what is perceived as real time imagery.

In one example, user preferences can be employed to control how a sequence is weighted and/or arranged with respect to integration times. For example, a first user may prefer to over-emphasize warm objects in a scene and thus additional images with shorter integration times may be scheduled while a second user may prefer to over-emphasize cold objects in a scene and thus additional images with longer integration times may be scheduled.

In one example, integration time selection may be determined by the presence and/or absence of outlying data and a relationship between that outlying data and motion data. For example, if the outlying data is associated with a static item (e.g., a floodlight in a nighttime scene), then over time the example systems and methods may realize that the item associated with the outlying data is not moving and fewer image acquisitions with an integration time tailored to handle that outlying data may be performed. However, if the outlying data is associated with a moving item (e.g., human against a cold backdrop), then the example systems and methods may realize that the item associated with the outlying data is moving and additional image acquisitions with an integration time tailored to handle that outlying data may be performed.

DEFINITIONS

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer component", as used herein, refers to a computer-related entity (e.g., hardware, firmware, software, software in execution, combinations thereof). Computer components may include, for example, a process running on a processor, a processor, an object, an executable, a thread of execution, a program, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data that can be read by a computer. A computer-readable medium may take forms, including, but not limited to, non-volatile media (e.g., optical disk, magnetic disk), and volatile media (e.g., semiconductor memory, dynamic memory). Common forms of computer-readable mediums include floppy disks, hard disks, magnetic tapes, CD-ROMs, RAMs, ROMs, (carrier waves/pulses), and so on.

"Data store", as used herein, refers to a physical and/or logical entity that can store data. A data store may be, for example, a database, a table, a file, a list, a queue, a heap, a memory, a register, a disk, and so on. In different examples a data store may reside in one logical and/or physical entity and/or may be distributed between multiple logical and/or physical entities.

"Logic", as used herein, includes but is not limited to hardware, firmware, software and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. In some examples, logic may be fully embodied as software. Where multiple logical logics are described, it may be possible in some examples to incorporate the multiple logical logics into one physical logic. Similarly, where a single logical logic is described, it may be possible in some examples to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logics and thus may be loaded and/or executed in serial, parallel, massively parallel and other manners.

Suitable software for implementing various components of example systems and methods described herein may be developed using programming languages and tools (e.g., Java, C, C#, C++, SQL, APIs, SDKs, assembler). Software, whether an entire system or a component of a system, may be embodied as an article of manufacture and maintained or provided as part of a computer-readable medium.

"User", as used herein, includes but is not limited to, one or more persons, software, computers or other devices, or combinations of these.

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

It will be appreciated that electronic and software applications may involve dynamic and flexible processes and thus that illustrated blocks can be performed in other sequences different than the one shown and/or blocks may be combined or separated into multiple components. In some examples, blocks may be performed concurrently, substantially in parallel, and/or at substantially different points in time.

FIG. 1 illustrates a computer-implemented method 100. The actions included in method 100 may be performed repetitively. Method 100 may include, at 110, acquiring an intensity data using a detector configured to operate for an integration time. The acquisition may occur, for example, at 60 Hz. The intensity data may be, for example, thermal intensity data acquired from an infrared detector. Method 100 may also include, at 120, extracting a useable data from the intensity data. "Useable" data may be defined as data falling inside a pre-determined range. This pre-determined range may be, for example, the linear response range of a detector(s) in a long wave infrared imaging system.

Method 100 may also include, at 130, updating a rolling composite image with the useable data. In one example, the updating may be performed substantially in parallel with other actions taken in method 100.

Method 100 may also include, at 140, selectively automatically updating the integration time. Whether the integration time is updated may be determined by whether the intensity data included a value that fell outside the pre-determined range. For example, if the thermal intensity data included a value that indicated a saturated detector, then a shorter integration time may be programmed. Similarly, if the thermal intensity data included a value that indicated a detector received less than a meaningful amount of energy, then a longer integration time may be programmed.

While FIG. 1 illustrates various actions occurring in serial, it is to be appreciated that various actions illustrated in FIG. 1 could occur in parallel. By way of illustration, a first process could acquire data, a second process could extract data, a third process could update a rolling composite image, and a fourth process could update the integration time. While four processes are described, it is to be appreciated that a greater and/or lesser number of processes could be employed and that lightweight processes, regular processes, threads, and other approaches could be employed.

In one example, a method is implemented as processor executable instructions and/or operations stored on a computer-readable medium. Thus, in one example, a computer-readable medium may store processor executable instructions operable to perform a method that includes acquiring data, extracting data, updating a rolling composite image, and automatically updating an integration time that controls, at least in part, the data acquisition. While the above method is described being stored on a computer-readable medium, it is to be appreciated that other example methods described herein may also be stored on a computer-readable medium.

Figure 2:
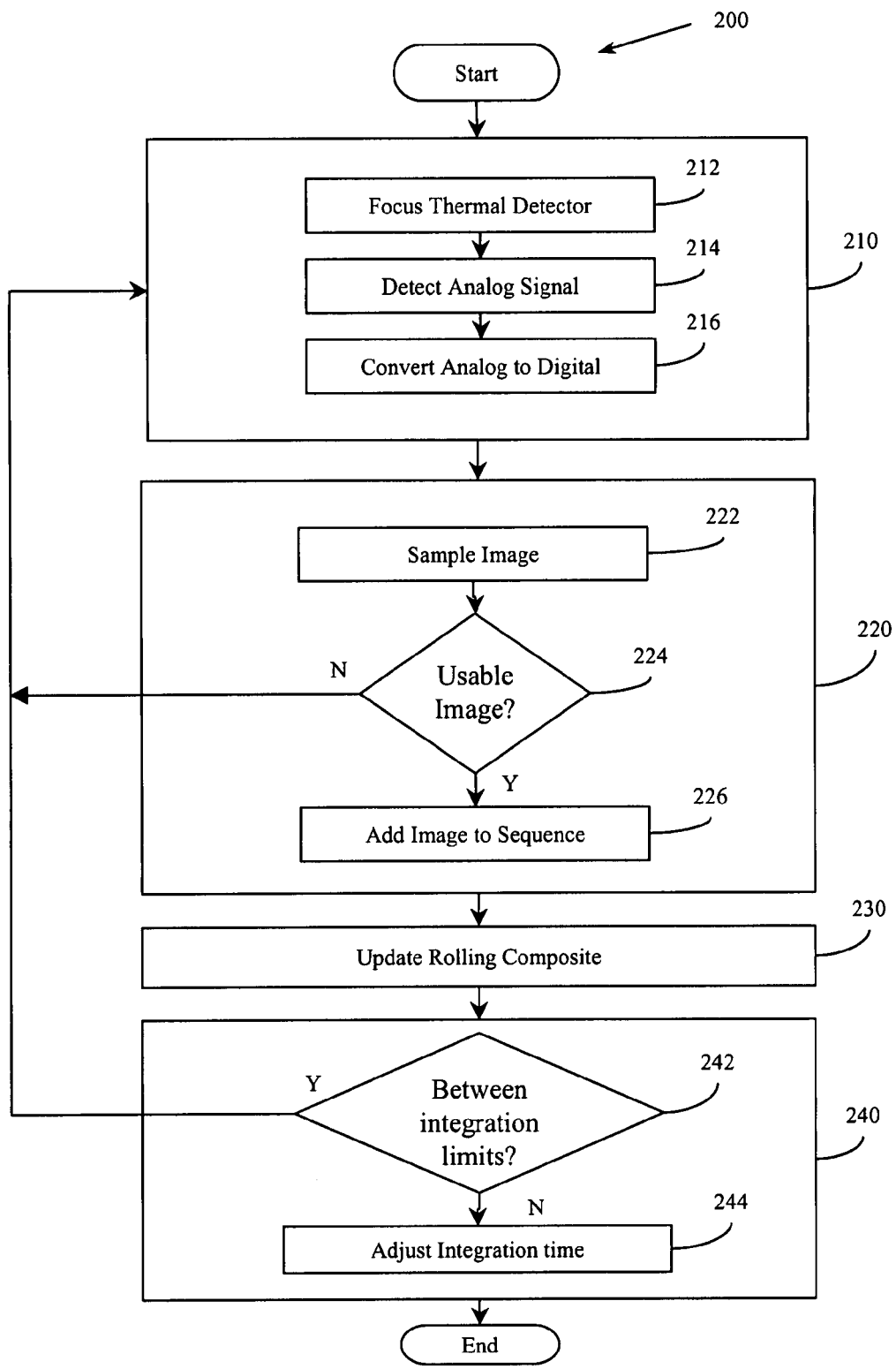
FIG. 2 illustrates an example method for automatically optimizing cyclic integration.

FIG. 2 illustrates a computer-implemented method 200. The actions included in method 200 may be performed repetitively. Method 200 may include, at 210, acquiring data. Acquiring the data may include several actions. For example, method 200 may include, at 212, focusing a thermal detector. Method 200 may also include, at 214, detecting an analog signal from the focused detector. The analog signal received from the detector may be a representation of the signal intensity at one of several individual detectors. Method 200 may also include, at 216, converting the analog signal acquired at 214 to a digital signal. The digital signal may be a representation of the analog signal.

Method 200 may also include, at 220, extracting data. Extracting data may include several actions. For example, method 200 may include, at 222, acquiring a sample image. The sample image may be, for example, a composite image from one detector or from multiple detectors.

Method 200 may also include, at 224, determining whether the acquired image produced a signal that is useable. "Useable" data may be defined as data falling inside a pre-determined range. This pre-determined range may be, for example, the linear response range of detectors in a long wave infrared imaging system.

Method 200 may also include, at 226, adding the useable data to a sequence of useable data. The sequence of useable data may be associated with a series of images that fall inside pre-determined ranges. The ranges may be, for example, preset based on the characteristics of the particular detector.

Method 200 may also include, at 230 adding an acquired image to a rolling composite image. The rolling composite image(s) may be viewed on a screen as a "real time" image. In one example, the rolling composite image may be provided at 30 Hz. The phrase "real time" may be defined as an image being viewed substantially as it is captured. The rolling composite may be deemed to be "real time" if, for example, the refresh rate of the rolling sequence is less than the refresh rate of the image acquisition device, (e.g., 30 Hz vs 60 Hz).

Method 200 may also include, at 242, determining whether the integration time used to capture the image produced useable data. Method 200 may also include, at 244, changing the integration time based on the amount of useful data in the acquired image. The system may learn over time to eliminate, add, and/or amend certain integration times based on the amount of useful data that has been produced using those certain integration times. In one example, a correlation may be made between outlying data and moving objects. For example, a moving object associated with outlying data may produce a more rapid and/or intense integration time amendment.

Figure 3:
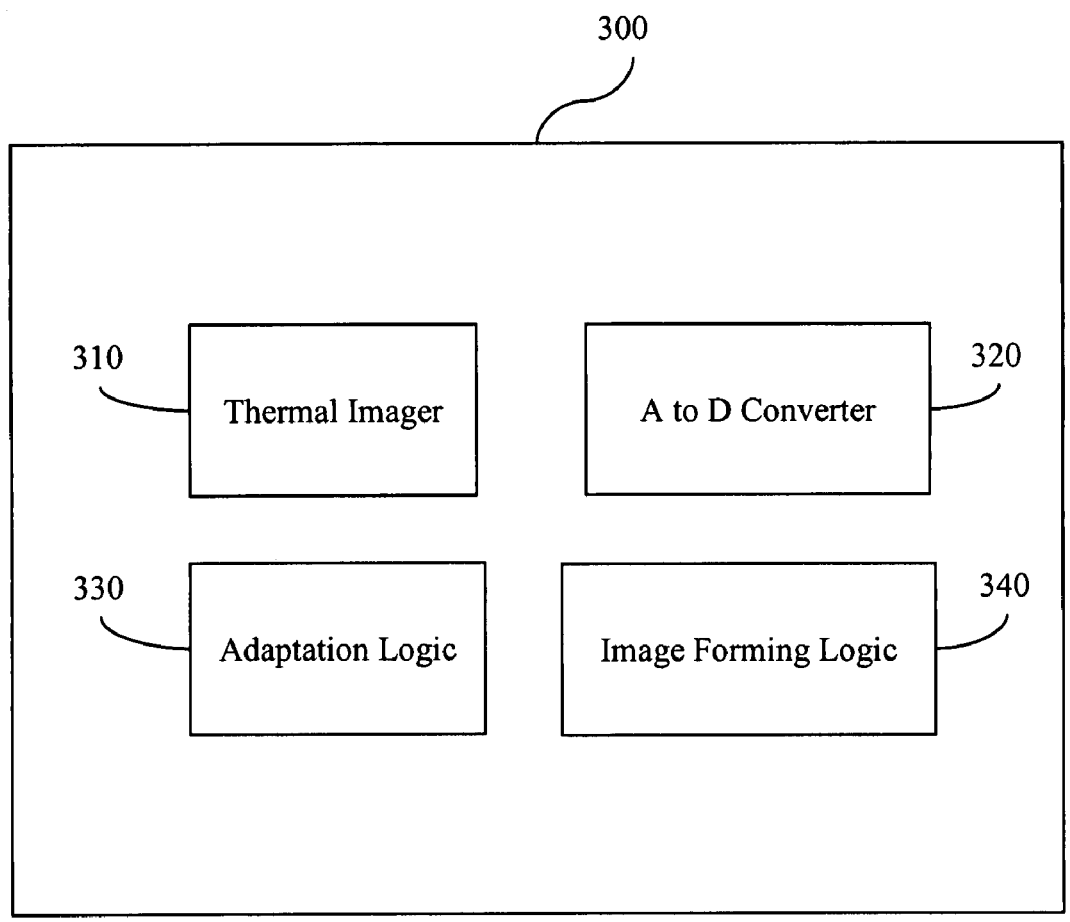
FIG. 3 illustrates an example system for automatically optimizing cyclic integration.

FIG. 3 illustrates a system 300 that includes a thermal imager 310. The thermal imager 310 may be configured to acquire a series of thermal images by operating a detector 320 for configurable periods of time. While a thermal imager 310 is described, it is to be appreciated that in some examples other imagers may be employed. Analog data acquired by thermal imager 310 may be converted to digital data using, for example, an A to D converter 320. System 300 may also include an adaptation logic 330 to determine whether to manipulate the duration of the configurable period(s) of time. Whether the configurable period of time (e.g., an integration time) will be manipulated may depend on whether a member of the series of thermal images includes data falling outside a linear response region for the detector 310.

In one example, system 300 may also include an image forming logic 340 that is configured to produce a rolling composite image from data extracted from members of the series of thermal images. Images produced by image forming logic 340 may be displayed, for example, on a video monitor. In one example, the images may be displayed at 60 Hz.

Figure 4:
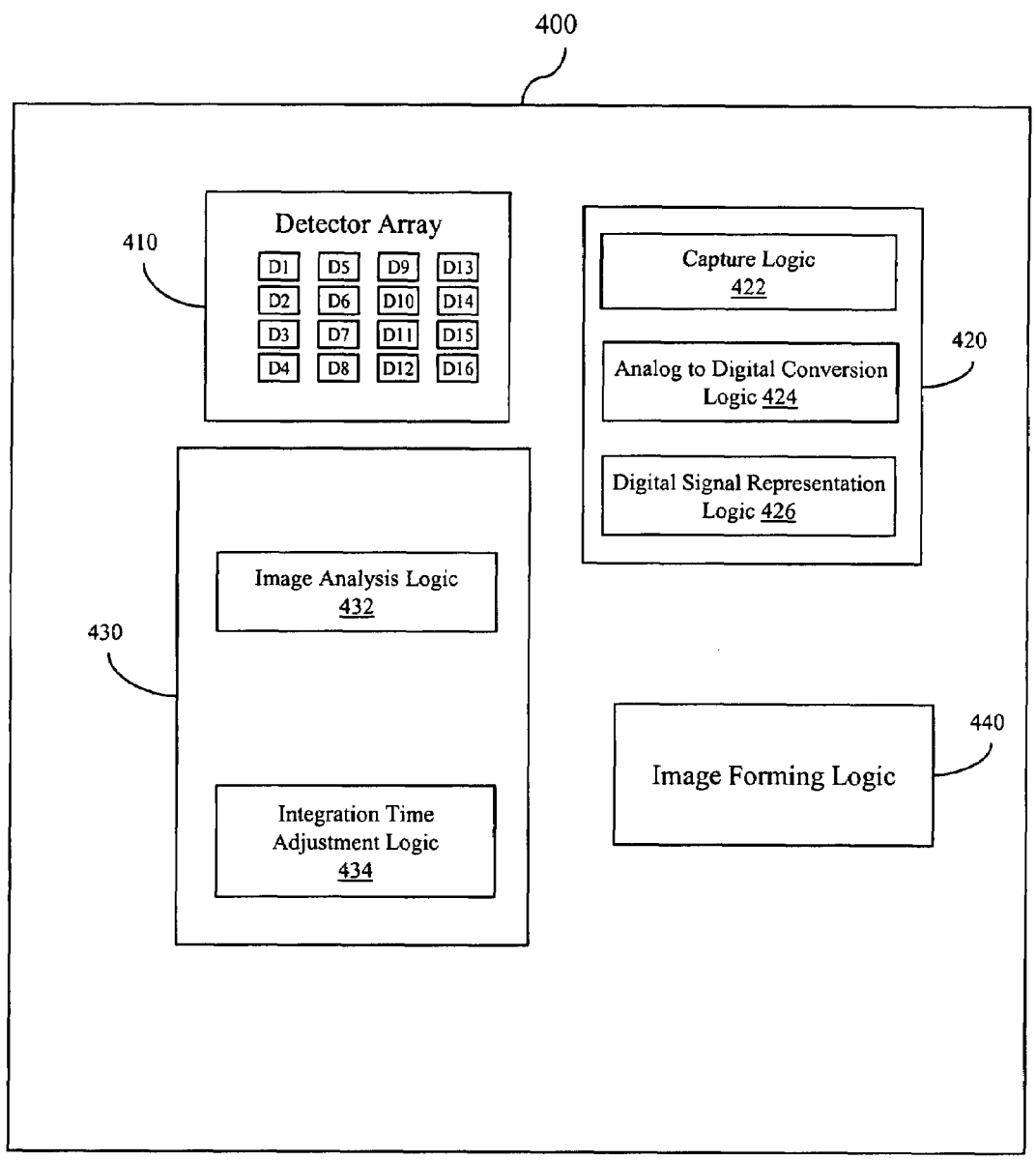
FIG. 4 illustrates an example system for automatically optimizing cyclic integration.

FIG. 4 illustrates a system 400 that includes a detector array 410. The detector array 410 may acquire a series of thermal images by collecting analog thermal intensity data for configurable periods of time. While a thermal detector array 410 is described, it is to be appreciated that in some examples other detectors may be employed. Detector array 410 may include a series of detectors arranged in a certain pattern, and may include, for example, detectors D1 through D16.

System 400 may also include logic 420 to capture and process the analog signal acquired by the detector array 410. In one example, the logic 420 may include an analog to digital conversion logic 424 that converts a signal acquired by capture logic 422. Capture logic 422 may acquire analog signals from elements (e.g., D1-D16) in detector array 410. System 400 may also include logic 426 to arrange the digital signal to form a digital representation of the analog signal.

In one example, system 400 may also include an adaptation logic 430 that includes several elements. The elements may include an image analysis logic 432. Logic 432 may analyze the signal with respect to data acquisition associated with the detector array 410. The analysis logic 432 may determine whether the signal(s) fall within acceptable limits (e.g., linear response range) of the array 410. The limits may be predetermined or selectable. System 400 may also include logic 434 to adjust the integration time of one or more elements of the detector array 410. The logic 436 may select an integration time that is predetermined or selectable. The logic 434 may learn over time which integration times produce the most useable data and automatically adjust the predetermined levels according to the learning.

In one example, system 400 may also include an image forming logic 440 that is configured to produce a rolling composite image from data extracted from members of the series of thermal images. Image forming logic 440 may, for example, arrange the images in a pattern to be viewed one after the other to produce "real time" images.

Figure 5:
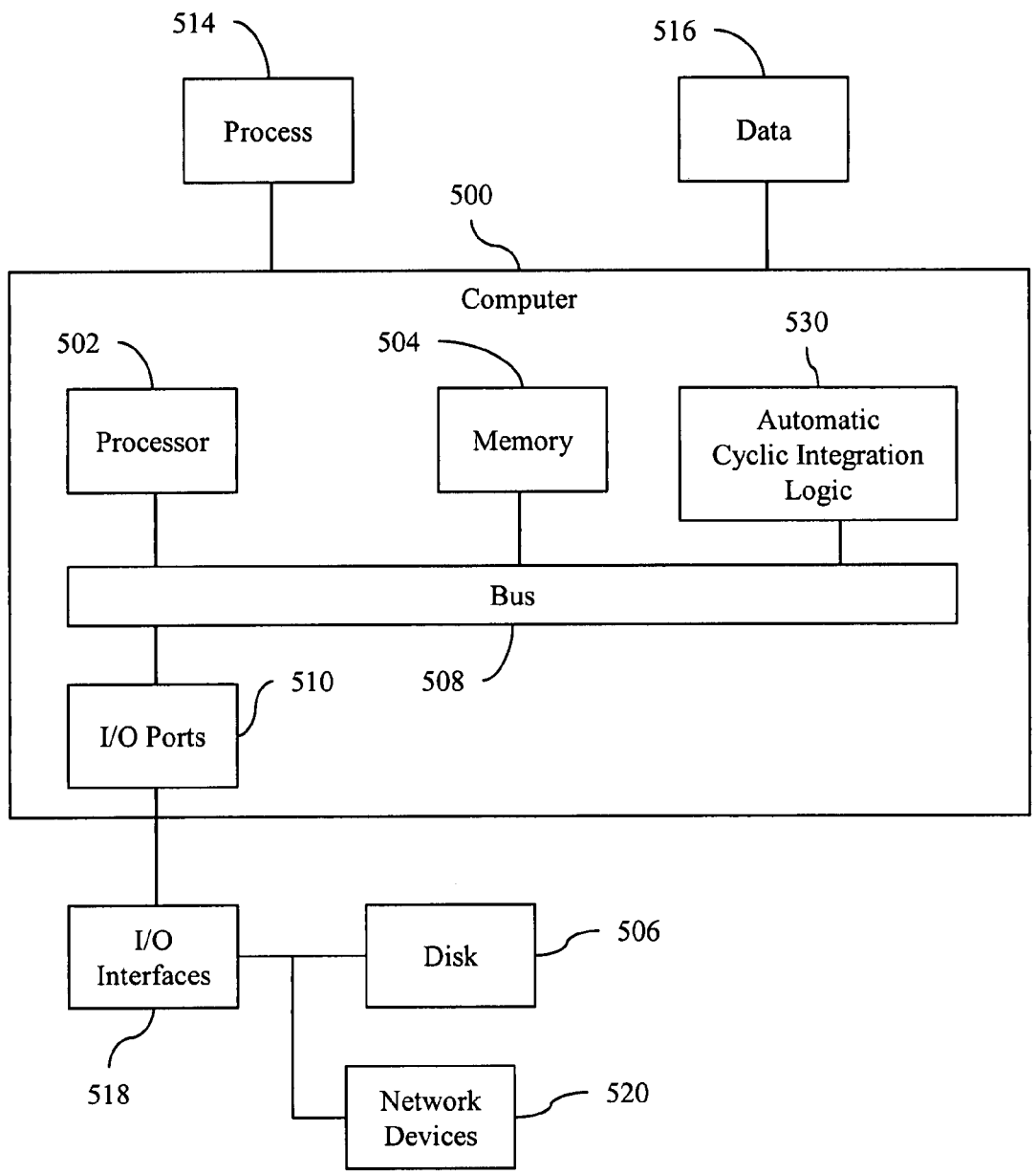
FIG. 5 illustrates an example computing environment in which example systems and methods illustrated herein may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, computer 500 may include an automatic cyclic integration logic 530 to facilitate automatically determining integration times for an imaging system (e.g., IR system). In different examples, logic 530 may be implemented in hardware, software, firmware, and/or combinations thereof.

In one example, logic 530 may provide means for controlling a detector (e.g., IR detector, optical detector) to acquire a set of thermal intensity data from a scene. The data may be acquired in shots that last for an integration time period.

Logic 530 may also provide means (e.g., hardware, software, firmware) for selecting a first subset of data from the set of thermal intensity data. The first subset of data may be data that falls within a desired range for the detector (e.g., within linear response range). Logic 530 may also provide means (e.g., hardware, software, firmware) for selecting a second subset of data from the set of thermal intensity data. The second subset of data may be data that falls outside the desired range for the detector. Logic 530 may also provide means (e.g., hardware, software, firmware) for selectively updating a rolling composite image based, at least in part, on the first subset of data. Thus, useful data may be extracted from an image and added to a rolling composite on the fly rather than using a conventional post acquisition rendering technique. Logic 530 may also provide means (e.g., hardware, software, firmware) for selectively updating the integration time period based, at least in part, on the second subset of data. For example, data falling outside the desired range may indicate that a different and/or new integration time may be desired.

Generally describing an example configuration of computer 500 processor 502 may be various processors including dual microprocessor and other multi-processor architectures. Memory 504 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

Disk 506 may be operably connected to the computer 500 via, for example, an input/output interface (e.g., card, device) 518 and an input/output port 510. Disk 506 may be, for example, a magnetic disk drive, a solid state disk drive, a floppy disk drive, a tape drive, a Zip drive, a flash memory card, and/or a memory stick. Furthermore, disk 506 may be a CD-ROM, a CD recordable drive (CD-R drive), a CD rewriteable drive (CD-RW drive), and/or a digital video ROM drive (DVD ROM). Memory 504 can store processes 514 and/or data 516, for example. Disk 506 and/or memory 504 can store an operating system that controls and allocates resources of computer 500.

Bus 508 may be a single internal bus interconnect architecture and/or other bus or mesh architectures. While a single bus is illustrated, it is to be appreciated that computer 500 may communicate with various devices, logics, and peripherals using other busses (e.g., PCIE, SATA, Infiniband, 1394, USB, Ethernet). Bus 508 can be types including, for example, a memory bus, a memory controller, a peripheral bus, an external bus, a crossbar switch, and/or a local bus. The local bus may be, for example, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

Computer 500 may interact with input/output devices via i/o interfaces 518 and input/output ports 510. Input/output devices may be, for example, a keyboard, a microphone, a pointing and selection device, cameras, video cards, displays, disk 506, network devices 520, and so on. Input/output ports 510 may include, for example, serial ports, parallel ports, and USB ports.

Computer 500 can operate in a network environment and thus may be connected to network devices 520 via i/o interfaces 518, and/or i/o ports 510. Through the network devices 520, computer 500 may interact with a network. Through the network, computer 500 may be logically connected to remote computers. Networks with which computer 500 may interact include, but are not limited to, a local area network (LAN), a wide area network (WAN), and other networks. In different examples, network devices 520 may connect to LAN technologies including, for example, fiber distributed data interface (FDDI), copper distributed data interface (CDDI), Ethernet (IEEE 802.3), token ring (IEEE 802.5), wireless computer communication (IEEE 802.11), and Bluetooth (IEEE 802.15.1). Similarly, network devices 520 may connect to WAN technologies including, for example, point to point links, circuit switching networks (e.g., integrated services digital networks (ISDN)), packet switching networks, and digital subscriber lines (DSL).

Figure 6:
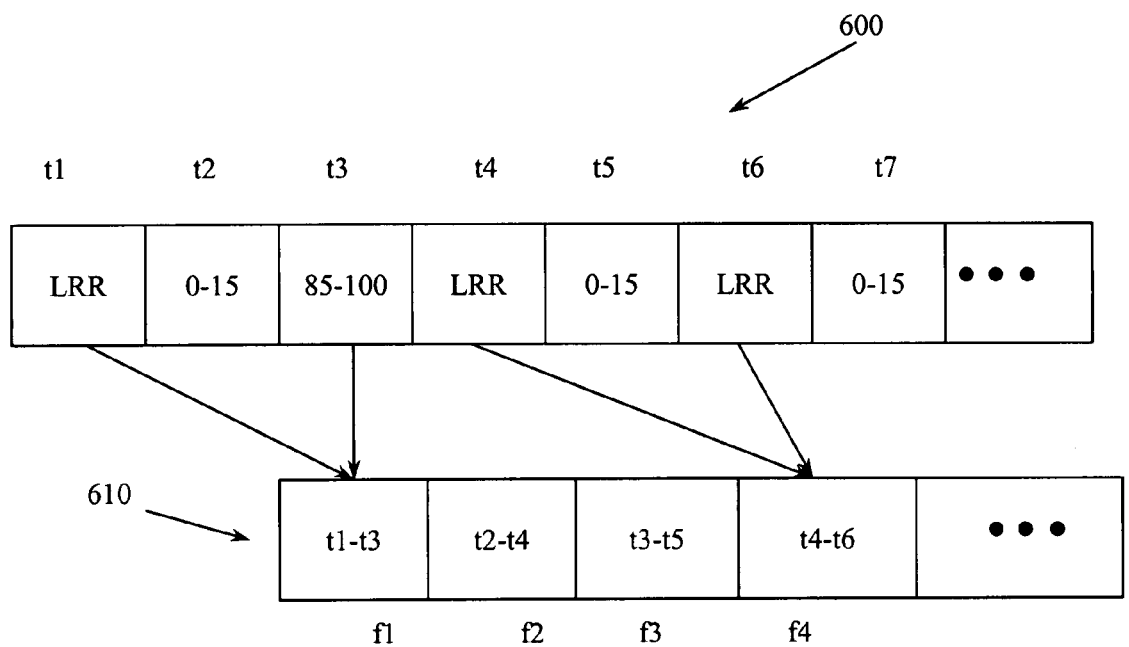
FIG. 6 illustrates an example image acquisition sequence produced by an example system or method.

FIG. 6 illustrates a sequence 600 of integration times and a corresponding sequence 610 of frames used in producing a rolling composite image. The sequence 600 of integration times begins at t1 and progresses to t7. At t1, an integration time determined by the linear response region (e.g., 15-85%) may be used to acquire an image. At t2 an integration time determined by the 0-15% range of a detector may be used to acquire an image and at t3 an integration time determined by the 85-100% range of a detector may be used to acquire an image. At t4, the sequence may return to the 15-85% range. Based on determinations made on images acquired at t1 through t4, the sequence may subsequently alternate between 15-85% and 0-15%. For example, images acquired at t1 and t4 may indicate the presence of a cold item that requires a longer integration time (e.g., 0-15%) and no warm items. Example, systems and methods described herein may produce these sequences in response to learning over time. Example systems and methods may, alternatively and/or additionally, include pre-planned sequences to which times can be added, from which times can be dropped, and for which times can be amended.

Figure 7:
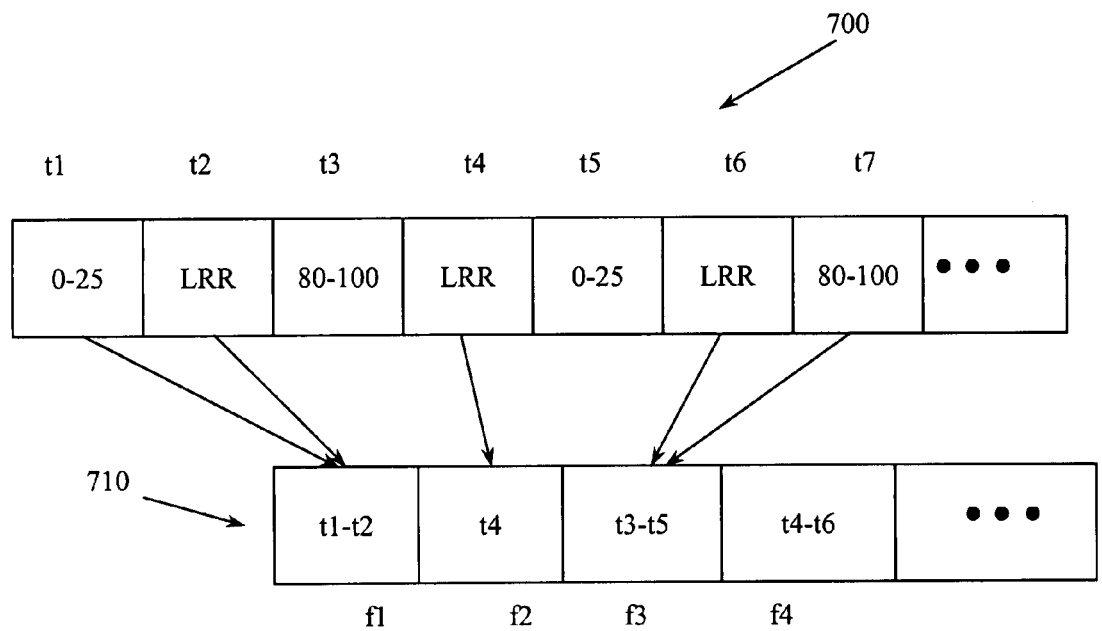
FIG. 7 illustrates an example image acquisition sequence produced by an example system or method.

FIG. 7 illustrates a sequence 700 of integration times and a corresponding sequence 710 of frames used in producing a rolling composite image. The sequence 700 of integration times begins at t1 and progresses to t7. At t1, an integration time determined by the linear response region (e.g., 25-80%) may be used to acquire an image. At t2 an integration time determined by the 0-20% range of a detector may be used to acquire an image and at t3 an integration time determined by the 80-100% range of a detector may be used to acquire an image. At t4, the sequence may return to the 25-80% range. Based on determinations made on images acquired at t1 through t4, the sequence may subsequently alternate between 20-80% and 0-20%. For example, images acquired at t1 and t4 may indicate the presence of a cold item that requires a longer integration time (e.g., 0-20%) and no warm items.

Sequence 600 and 700 may both employ logic to add or remove Integration times based on the amount of useable data returned. For example, if an integration time t1 does not return useable data after several scans, the logic may stop using that time or use it less often until if returns useable data. The logic may also amend the integration times to test whether a slightly different integration time produces useable data.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
   an imager configured to acquire a series of images by operating a detector to acquire an analog thermal intensity signal for one or more configurable periods of time;
   an adaptation logic configured to determine whether to manipulate the duration of one or more of the configurable periods of time based, at least in part, on a relation between the degree to which a member of the series of images includes data falling outside a linear response region for the detector and the degree to which an item generating the data is identifiable as a moving item; and
   a processor configured to execute processor executable instructions associated with the adaptation logic.

2. The system of claim 1, including an image forming logic configured to produce a rolling composite image from data extracted from members of the series of images.

3. The system of claim 1, the images being thermal images and the detector being an infrared detector operating in one or more of, a long wave IR spectrum, a mid-wave IR spectrum, and a near IR spectrum.

4. The system of claim 3, the imager being configured to acquire images at a rate between 50 Hz and 70 Hz and the image forming logic providing rolling composite images at a rate between 28 Hz and 32 Hz.

5. The system of claim 1, where the imager includes a detector array.

6. The system of claim 1, where the one or more configurable periods of time are described in a planned sequence, and where the adaptation logic is configured to selectively manipulate the planned sequence based, at least in part, on whether members of the series of images include data falling outside one or more desired thresholds.

7. The system of claim 6, where the adaptation logic is configured to selectively adds a new configurable period of time to the planned sequence.

8. The system of claim 7, where the adaptation logic is configured to selectively removes a configurable period of time from the planned sequence.

9. The system of claim 8, where the adaptation logic is configured to selectively amends an existing configurable period of time in the planned sequence.

10. A computer-implemented method, comprising:
    acquiring an intensity data using a detector configured to operate for an integration time;
    selectively extracting a useable data from the intensity data, the useable data falling inside a pre-determined response range of the detector;
    updating a rolling composite image with the useable data; and
    selectively automatically updating the integration time based, at least in part, on a relation between the degree to which the intensity data is outside the pre-determined response range of the detector and the degree to which an item generating the intensity data is identifiable as a moving item.

11. The method of claim 10, the intensity data being a thermal intensity data acquired from one or more of, an infrared detector, and an optical detector.

12. The method of claim 10, where acquiring the intensity data comprises:
    selectively focusing the detector;
    receiving an analog signal; and
    converting the analog signal to a digital signal.

13. The method of claim 10, where extracting the useable data comprises:
    acquiring a sample image;
    determining whether the sample image includes an in-range data; and
    selectively adding the in-range data to a set of useable data from which the rolling composite image is to be updated.

14. The method of claim 10, where updating the rolling composite image includes adding a portion of an image associated with the useable data to the rolling composite image.

15. The method of claim 10, where automatically updating the integration time includes one or more of, lengthening the integration time, and shortening the integration time.

16. The method of claim 10, the integration time being a member of a set of planned integration times.

17. The method of claim 16, where updating the integration time includes one or more of, amending a member of the set of planned integration times, deleting a member of the set of planned integration times, and adding a new member to the set of planned integration times.

18. The method of claim 10, where an integration time is selectively updated based, at least in part, on a user preference concerning the thermal intensity towards which an integration time should be biased.

19. A system, comprising:
    means for controlling a detector to acquire a set of thermal intensity data from a scene for an integration time;
    means for selecting a first subset of data from the set of thermal intensity data, the first subset being data falling within a desired range;
    means for selecting a second subset of data from the set of thermal intensity data, the second subset being data falling outside the desired range;
    means for selectively updating a rolling composite image based, at least in part, on the first subset of data; and
    means for selectively updating the integration time based, at least in part, on a relation between the degree to which the second subset of data and the degree to which an item generating the set of thermal intensity data is identifiable as a moving item.

* * * * *

UNITED STATES PATENT AND TRADEMARK OFFICE
CERTIFICATE OF CORRECTION

PATENT NO. : 7,573,033 B2
APPLICATION NO. : 11/710018
DATED : August 11, 2009
INVENTOR(S) : Paximadis et al.

It is certified that error appears in the above-identified patent and that said Letters Patent is hereby corrected as shown below:

In column 12, line 28, delete "Example," and insert --Example--.

In column 13, line 47, delete "adds" and insert --add--.

In column 13, line 50, delete "removes" and insert --remove--.

In column 13, line 53, delete "amends" and insert --amend--.

Signed and Sealed this

Twentieth Day of October, 2009

David J. Kappos
*Director of the United States Patent and Trademark Office*